United States Patent [19]

Narita

[11] 4,250,612

[45] Feb. 17, 1981

[54] METHOD FOR WORKING THE END OF A SYNTHETIC RESIN MOLDING HAVING LAMINATED THEREON A METAL FOIL

[75] Inventor: Kouzi Narita, Nagoya, Japan

[73] Assignee: Inoue Gomu Kogyo Kabushiki Kaisha, Nagoya, Japan

[21] Appl. No.: 944,214

[22] Filed: Sep. 20, 1978

[30] Foreign Application Priority Data

Jul. 19, 1978 [JP] Japan .................... 53-8798

[51] Int. Cl.³ ........................... B22D 11/126
[52] U.S. Cl. ..................... 29/527.1; 29/524; 29/DIG. 24; 29/DIG. 8; 29/DIG. 10; 264/322; 264/266; 264/241; 264/154; 29/DIG. 11; 29/DIG. 29
[58] Field of Search ............. 29/527.1, 524, DIG. 24, 29/DIG. 8, DIG. 10, DIG. 29; 264/320, 154, 241, 266, 322

[56] References Cited

U.S. PATENT DOCUMENTS

| 3,490,139 | 1/1970 | McKinven, Jr. | 29/527.1 |
| 3,815,215 | 6/1974 | Medawar | 29/527.1 |
| 4,081,600 | 3/1978 | Kueneman et al. | 264/320 |

*Primary Examiner*—Francis S. Husar
*Assistant Examiner*—V. K. Rising
*Attorney, Agent, or Firm*—Sughrue, Rothwell, Mion, Zinn and Macpeak

[57] ABSTRACT

A method of processing the end and joint portion of a decorative molding comprising a synthetic resin base having laminated thereon a layer of metal foil is disclosed. In accordance with the invention areas of reduced thickness are formed in the moldings to be joined such that a substantially level joint can be formed without using a separate joining member.

11 Claims, 6 Drawing Figures

METHOD FOR WORKING THE END OF A SYNTHETIC RESIN MOLDING HAVING LAMINATED THEREON A METAL FOIL

BACKGROUND OF THE INVENTION

1. Field of the Invention

This invention relates to a method for processing the end of decorative molding having laminated on a synthetic resin base a metal foil, in particular, it relates to a method for working the end into a shape suitable for joining another decorative molding.

2. Description of the Prior Art

Various moldings have so far been used in furniture or motor vehicle. With motor vehicles, for example, to reduce the body weight of the vehicle slightly a synthetic resin molding comprising a synthetic resin having buried therein or laminated thereon a metal foil or vacuum-deposited metal foil is used in place of the all metal trim. Above all, synthetic moldings used, for example, for the roof drip or window frame of a motor vehicle must possess sufficient heat resistance since they are to be directly exposed to sun-light. In this regard see U.S. Pat. Nos. 3,681,180 and 3,811,989. In addition, as will be described hereinafter, recent window frames employ a so-called direct grazing system to assure safety wherein the window glass is directly pasted or fastened to a body flange. Since the molding is directly fixed to the window frame, it is necessary to select a resin having excellent mechanical strength for the molding. Further, the decorative molding naturally tends to become rusty, thus, a stainless steel foil is generally used as the metal foil.

However, as is well known, stainless steel is an alloy comprising mainly iron and has a much higher rigidity than an aluminum foil or synthetic resin, and hence it is difficult to work. For example, with respect to moldings to be used for the above-described window frame, it is necessary to work them into a shape along the window frame which requires bending or the like. With stainless steel moldings, however, working small curve like corners into the frame has been almost impossible without using a joining member.

In the past, two moldings have also been joined at their straight parts. With moldings having a synthetic resin layer as a backing and a reinforcing layer, the entire molding is so thick that, when two are joined by mere press working, a level difference is formed at the joint, which spoils the appearance.

SUMMARY OF THE INVENTION

Thus, the primary object of the present invention is to provide a novel method for working the end of a synthetic resin molding containing a metal foil layer having high rigidity without using any joining member.

An object of this invention is to provide a method for beautifully finishing an end of decorative molding.

Another object of this invention is to provide a molding which does not require any joining member in the case of joining another decorative molding, and to provide a method for processing the end of said molding.

A further object of this invention is to provide a novel method enabling one to work the molding extremely easily.

Other objects will become apparent from the following descriptions.

The present invention will now be described in more detail by reference to the accompanying drawings.

DETAILED DESCRIPTION OF THE INVENTION

Figure 1:
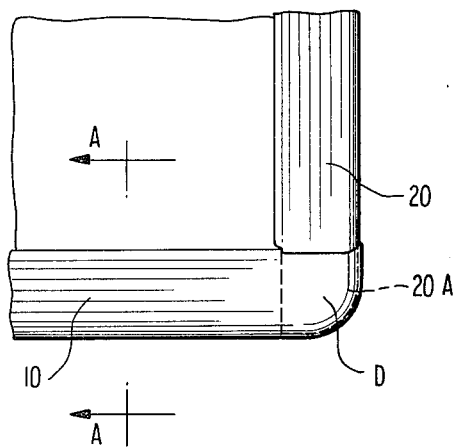
FIG. 1 is a front view of a window molding for an automobile.

In the drawings, the numeral 10 designates a synthetic resin molding consisting of a synthetic resin base 11 and a metal foil 12. Molding 10 is joined to synthetic resin molding 20 by means of an end joint portion D formed in molding 10 and a level difference F formed in molding 20 as will be explained in detail below.

Figure 2:
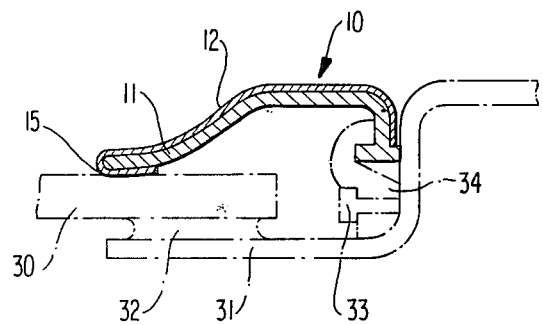
FIG. 2 is a sectional view taken on line A—A of FIG. 1.

In FIG. 2, window glass 30 of a motor vehicle is fixedly fastened to body flange 31 on the body side with adhesive 32, with molding 10 being applied to the outer side. Molding 10 is fixed to body 31 at one side via clip 34 which is fastened by T-stud 33, with the other side of the molding being pressed against window glass 30 to thereby seal the glass through its elasticity (spring action).

As the synthetic thermoplastic resin forming base 11, those which possess excellent heat resistance and rigidity are desirable for the reasons discussed above. Thus, resins such as polycarbonate, acrylonitrile/butadiene copolymer resin, polypropylene, polyamide, etc. are suitable examples. The thickness of the base is usually about 1.5-2 mm since it functions as a reinforcing and backing layer for metal foil 12. Metal foil 12 is preferably a stainless steel foil having a thickness of usually about 0.12-0.25 mm. Metal foil 12 is laminated to the surface of the base 11 with preferably an adhesive like acrylic adhesive.

Figure 3:
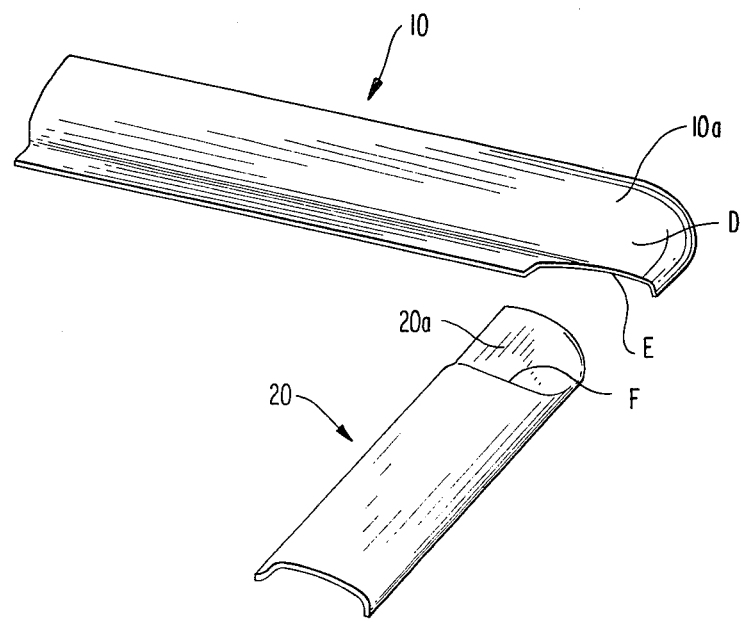
FIG. 3 is a dismantled perspective view of the joint in FIG. 2.
Figure 4:
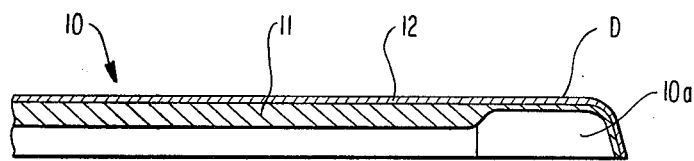
FIG. 4 is a sectional view of synthetic resin molding worked according to the present invention.

The end structure of molding 10 will now be described. As illustrated in FIGS. 3 and 4, end joint portion D is formed in pod-shaped end portion 10a of molding 10 with synthetic resin base layer 11 reduced in thickness under said end joint portion D.

Molding 20 is joined to molding 10 at end joint portion D. Molding 20 is formed into a pod shape with a depression at end portion 20a such that end portion 20a is received in concavity E of said pod-like end portion 10a of molding 10 and the upper surfaces of moldings 10 and 20 are substantially level when joined.

Figure 5:
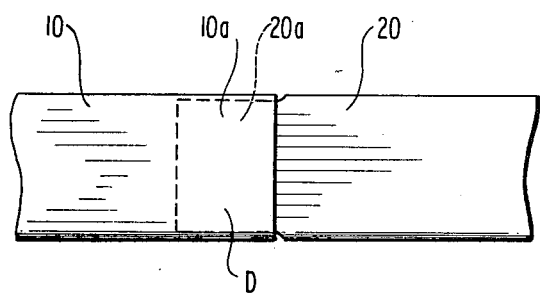
FIGS. 5 and 6 are plane views showing linearly joined moldings.
Figure 6:
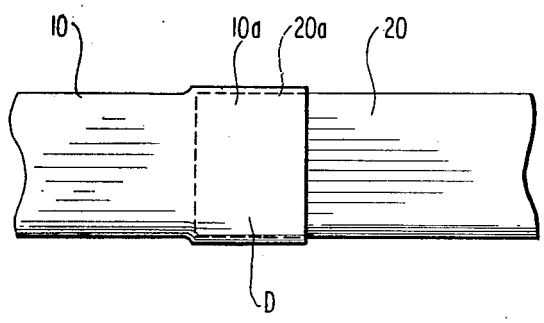

The above-described embodiment is an example of joining the moldings at a right angle to one another. FIGS. 5 and 6 illustrate an example of joining the moldings in a straight direction. In this case, synthetic resin base 11 is reduced in thickness at end joint portion D of molding 10. In some cases, end joint portion D may be enlarged as illustrated in FIG. 6. End portion 20a of molding 20 is formed with a recess or depression F such that end portion 20a is received in the concavity formed in such joint portion D as described above. Additionally, in the case of enlarging end joint portion D as illustrated in FIG. 6, molding 20 can be received therein without working the end of molding 20, i.e., without forming a recess therein.

The method of working the end portions of the moldings to obtain the above-described constructions will be now described.

Firstly, synthetic resin base layer 11 may be cut to the desired thickness at molding end portion 10a through mechanical working such as cutting or abrading using a rotary blade or a buff. The thickness of joint portion D including the metal foil is generally cut to about 0.5 mm. Molding 10 having thinned end portion 10a is then formed into the desired shape through hot or cold pressing to form the joint portion. Metal foil 12 is compressed together with synthetic resin 11 at molding end 10a by this pressing work, and formed into a pod-like shape having a concavity E (FIG. 3) or enlarged to form joint portion D (FIG. 6).

Additionally, it is effective in this case to soften the synthetic resin by heating the synthetic resin base 11 at the end portion 10a to a temperature higher than its heat deformation temperature and to cut the synthetic resin layer 11 to the desired thickness using a rotary blade or like tool. It is also effective to cut the synthetic resin layer 11 using a blade or a saw equipped with a heating member, and to form the end into the desired shape through pressing work (about 200 kg/cm$^2$). Thus, the molding does not lose its rigidity after forming into a desired shape and there is scarcely observed a level difference upon engaging.

The end portion of the molding can be heated using an electric iron or a hot plate containing a heater directly contacting the synthetic resin base, or a hot blast or hot jet may be used. It is also possible to heat the resin using high frequency dielectric heating, through high frequency induction heating with the metal foil in turn heating the synthetic resin base, by applying ultrasonic waves using a horn connected to a ultrasonic wave generator, or by a combination of high frequency dielectric or induction heating and ultrasonic wave heating at the same time or at some interval.

The aforementioned heating means are well known in the art. The exact heating conditions cannot be defined unequivocally since they depend on the kind and shape of the resin used. However, given the molding it is desired to shape, the heating conditions can be readily determined by one skilled in the art. High frequency dielectric heating may be conducted at 28 MHz for several seconds, high frequency induction heating at 400 KHz for about 10 seconds and ultrasonic waves may be used at 30 KHz for several seconds to heat the molding in accordance with this invention.

Needless to say that the specific heating means, such as heating plates, horns or the like is selected based on the shape of the molding which is desired and the heating means which is most convenient for forming the shape.

According to another method, the synthetic resin base is not cut to the desired thickness through mechanical means as described above, but is formed into a thin layer through pressing work. That is, after heating joint portion D of end portion 10a to a temperature higher than its heat deformation temperature through the various methods described above, the synthetic resin base is pressed at end joint portion D to a given thickness and at the same time the metal foil 12 is formed into a desired shape by press molding. In this case, it is preferable to pre-heat the end portion in a press mold, in particular, a metal mold in contact with the synthetic resin base, since it serves to draw the resin and prevents the resin from cooling. However, the metal mold is desirably maintained at a temperature slightly lower than the heat deformation temperature of the resin, to prevent the synthetic resin from being quenched. This heating of the metal mold can be employed, in the case of cutting off the synthetic resin base through aforesaid mechanical means, for subsequent press molding.

In summary, the present invention enables one to easily conduct molding, enlarging or like shaping even when a metal foil having a high rigidity like stainless steel foil is used and the thickness at an end joint can be adjusted as desired, since press-molding is conducted after reducing the thickness of the synthetic resin base at the end joint of synthetic resin molding or after heating and softening or melting said synthetic resin base. In accordance with the present invention, moldings can be directly joined to one another without using any special connecting or joining member. Further, since the synthetic resin base is thinly constituted at the molding joint, there results almost no level difference between the joined moldings, thus a beautiful finish is obtained. Upon press working the end part, working can be effected with a lower pressure in comparison to conventional metal moldings. Thus, the present invention provides a method of enhancing practical values of synthetic resin moldings having laminated thereon a metal foil and has excellent economical aspects; for example, it does not require any joining member.

While the invention has been described in detail and with reference to specific embodiments thereof, it will be apparent to one skilled in the art that various changes and modifications can be made therein without departing from the spirit and scope thereof.

What is claimed is:

1. A method for working the end of a synthetic resin molding comprising a synthetic resin base having laminated thereon a metal foil, which method comprises partially reducing the thickness of the synthetic resin base at the end of the molding by mechanical working to form a thin portion at the end of the molding and then press molding said end into the desired shape.

2. A method for working the end of a synthetic resin molding comprising a synthetic resin base having laminated thereon a metal foil, which method comprises heating the synthetic resin base at the end of the molding to soften or melt said end, partially reducing the thickness of the softened or melted end of the molding by mechanical working to form a portion of reduced thickness at the end of the molding and then press molding said end into the desired shape.

3. A method for working the end of a synthetic resin molding comprising a synthetic resin base having laminated thereon a metal foil, which method comprises heating a synthetic resin base at the end joint portion of the molding to soften or melt said end of the molding, press molding said end of the molding to reduce the thickness of said synthetic resin base at said end and at the same time shape the end portion.

4. A method for working the end of a synthetic resin molding having laminated thereon a metal foil as described in claim 1 or 2, wherein said mechanical working is cutting or abrading.

5. The method for working the end of a synthetic resin molding having laminated thereon a metal foil as described in claim 2 or 3, wherein said heating is conducted by contacting said molding end with a hot plate.

6. The method for working the end of a synthetic resin molding having laminated thereon a metal foil as described in claim 2 or 3, wherein said heating is conducted using a hot blast or hot jet.

7. The method for working the end of a synthetic resin molding having laminated thereon a metal foil as described in claim 2 or 3, wherein said heating is by high frequency dielectric heating.

8. The method for working the end of a synthetic resin molding having laminated thereon a metal foil as described in claim 2 or 3, wherein said heating is by high frequency induction heating, and said synthetic resin base is thereby heated through the heat generated in said metal foil.

9. The method for working the end of a synthetic resin molding having laminated thereon a metal foil as described in claim 2 or 3, wherein said heating is by ultrasonic waves.

10. The method for working the end of a synthetic resin molding having laminated thereon a metal foil as described in claim 2 or 3, wherein said heating is by a combination of high frequency dielectric heating or high frequency induction heating and ultrasonic wave heating to be employed at the same time or separated at some interval of time.

11. The method for working the end of a synthetic resin molding having laminated thereon a metal foil as described in claim 1 or 2, wherein said press molding is by heating a press mold in contact with said synthetic resin base.

* * * * *